United States Patent
Harwalkar et al.

(10) Patent No.: US 12,205,251 B2
(45) Date of Patent: Jan. 21, 2025

(54) METHOD, APPARATUS AND SYSTEM FOR NORMALIZING PIXEL INTENSITY OF IMAGES

(71) Applicant: KONINKLIJKE PHILIPS N.V., Eindhoven (NL)

(72) Inventors: Pragati Harwalkar, Bangalore (IN); Hemanth Thayyullathil, Bangalore (IN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 17/766,265

(22) PCT Filed: Sep. 29, 2020

(86) PCT No.: PCT/EP2020/077156
§ 371 (c)(1),
(2) Date: Apr. 4, 2022

(87) PCT Pub. No.: WO2021/063903
PCT Pub. Date: Apr. 8, 2021

(65) Prior Publication Data
US 2024/0265497 A1     Aug. 8, 2024

(30) Foreign Application Priority Data
Oct. 3, 2019   (EP) .................................. 19201281

(51) Int. Cl.
*G06T 5/50*     (2006.01)
*G06T 5/00*     (2006.01)
(Continued)

(52) U.S. Cl.
CPC ................. *G06T 5/50* (2013.01); *G06T 5/00* (2013.01); *G06V 10/32* (2022.01); *G06V 10/761* (2022.01)

(58) Field of Classification Search
CPC .... G06T 5/00; G06T 5/50; G06T 5/90; G06T 2207/10072; G06T 2207/30004; G06V 10/32; G06V 10/761
See application file for complete search history.

(56) References Cited

U.S. PATENT DOCUMENTS

2005/0025347 A1    2/2005  Makram-Ebeid
2015/0371374 A1*  12/2015  Zeng ....................... G01M 3/38
                                                                  382/274
2018/0350051 A1*  12/2018  Boehm ...................... G06T 5/92

FOREIGN PATENT DOCUMENTS

CN       109272443 A      1/2019
JP        03266189 A     11/1991
WO    WO2018025006 A1    2/2018

OTHER PUBLICATIONS

PCT International Search Report, International application No. PCT/EP2020/077156, Dec. 1, 2020.
(Continued)

*Primary Examiner* — Daniel G Mariam

(57) ABSTRACT

The present disclosure relates to normalizing pixel intensity values of images. Qualitative images which have to be compared need to have actual pixel intensity values in a suitable range. Generally, the qualitative images to be compared are made to appear visually similar by adjusting display settings. First and second images having different actual pixel intensity values but appearing visually same are received. One or more normalized parameters are determined and using one or more contrast and illumination parameters associated with the first and second image. Thereafter, normalized pixel intensity values are determined using the one or more normalized parameters and a normalized image is generated. The pixel intensity values of the normalized image can be compared with actual pixel intensity values of the first image or second image.

20 Claims, 7 Drawing Sheets

(51) Int. Cl.
    *G06V 10/32* (2022.01)
    *G06V 10/74* (2022.01)

(56) References Cited

OTHER PUBLICATIONS

Tommaso C. et al., "A 3D Environment for Surgical Planning and Simulation", PhD Thesis, Mar. 25, 2011 (Mar. 25, 2011), pp. 1-198, XP055651457, retrieved from the Internet: URL:http://eprints.unife.it/393/ [retrieved on Dec. 10, 2019].

Simone G. et al., "Measuring Perceptual Contrast in Digital Images", Journal of Visual Communication and Image Representation, vol. 23, No. 3, Apr. 1, 2012 (Apr. 1, 2012),pp. 491-506, XP055752103.

Sakellaropoulos P. et al., "An Image Visualization Tool in Mammography", Medical Informatics and the Internet in Medicine, Taylor and Francis, London, GB, vol. 24, No. 1, Jan. 1999 (Jan. 1, 1999), pp. 53-73, XP008011806.

Maas S.J. et al., "Normalizing and Converting Image DC Data Using Scatter Plot Matching", Remote Sensing, 2010, 2, pp. 1644-1661.

Kak A.C. et al., "Principles of Computerized Tomographic Imaging", IEEE Press,1988.

Sun X. et al., "Histogram-Based Normalization Technique on Human Brain Magnetic Resonance Images from Different Acquisitions", BioMedical Engineering On Line, (2015) 14:73.

Gonzalez R.C. et al., "Digital Image Processing", Prentice Hall, Chapters 2,3 &4, 2002.

Tofts P. et al., "Quantitative MRI of the Brain: Measuring Changes Caused by Disease", Institute of Neurology University College London, Wiley, Chapter 1, Aug. 19, 2005.

* cited by examiner

METHOD, APPARATUS AND SYSTEM FOR NORMALIZING PIXEL INTENSITY OF IMAGES

CROSS-REFERENCE TO PRIOR APPLICATIONS

This application is the U.S. National Phase application under 35 U.S.C. § 371 of International Application No. PCT/EP2020/077156, filed on Sep. 29, 2020, which claims the benefit of European Application No. 19201281.3, filed on Oct. 3, 2019. These applications are hereby incorporated by reference herein.

The following specification particularly describes the invention and the manner in which it is to be performed.

FIELD OF THE INVENTION

The present disclosure relates in general to the field of image processing techniques. More particularly, but not specifically, the present disclosure relates to method, apparatus, and system for normalizing pixel intensity of images.

BACKGROUND OF THE INVENTION

Image processing techniques are widely used in various applications for analysing images. Image processing techniques are performed based on properties of an image (pixel intensity, color, saturation, contrast, hue, brightness and various other parameters). Different images can be compared provided the relevant parameters are within a comparable range. For example, images of a same object captured with different imaging devices may have different pixel intensity values due to settings of each imaging device. Likewise, various other parameters of two images representing a same object can vary, although the two images can look similar when viewed on a display unit such as a monitor. Often, display units apply settings on images as required for a viewer. For example, an image contrast can be changed in the display unit, image brightness can be changed in the display unit, etc. Advanced computing systems are available to process images and analyse the images according to application.

In medical imaging, images are acquired using different imaging devices, such as cameras, Computed Tomography (CT) devices, Magnetic Resonance Imaging (MRI) device, ultrasound devices, etc. A lab technician may have to compare images captured from different modalities (CT, MRI) at different time to analyse the images. Two images may appear visually same (i.e., qualitatively similar), but pixel intensity values of the two images can be different (i.e., quantitatively different). The two images are adjusted to appear visually the same to user using display settings (e.g., windowing). The computing systems, however, may compare image properties (e.g., pixel intensities) itself and typically do not use display properties for comparing images.

Existing systems normalize one of the two images with respect to the other image for enabling the computing systems to compare the images meaningfully. A few existing systems perform calibration to quantitatively represent the two images in a similar manner, but do not consider display settings that are used to make the two images appear visually similar. The solutions that such systems provide are not generic and is very subjective to the image parameters or the image content as discussed below.

A few existing systems perform intensity normalization techniques on qualitative images. Generally, histogram approach is followed to normalize intensity values. Intensity normalization factors can be measured from an entire image or a part of the image. When the whole image is considered by the method, the noise content in the image plays an important part and can affect normalization and hence only high SNR images are good candidates for such methods. When a part of the image is considered by the normalization method, as the normalization is driven fully by the pixel values in that region, it can be heavily biased and can fail in normalizing the other parts in the image. Thus, none of the existing systems normalize qualitative images effectively.

The information disclosed in this background of the disclosure section is only for enhancement of understanding of the general background of the invention and should not be taken as an acknowledgement or any form of suggestion that this information forms the prior art already known to a person skilled in the art.

SUMMARY OF THE INVENTION

In an embodiment, a method is disclosed for normalizing pixel intensity of images. Actual pixel intensity values generated by an image processing apparatus, one or more contrast parameters and one or more illumination parameters of a first image and a second image are received. In an embodiment, the first and the second image appear visually similar to a human eye despite different pixel intensities representing a same area in the first and second image. Further, one or more normalized parameters are determined using the one or more contrast and illumination parameters of the first and second image. Normalized pixel intensity values of the second image are determined based on the one or more normalized parameters and a normalized image is generated by transforming the second image with respect to the first image, using the normalized pixel intensity values.

An image processing apparatus is disclosed for normalizing pixel intensity of images. The image processing apparatus comprises a memory and a processor. The processor is configured to receive actual pixel intensity values generated by the image processing apparatus, one or more contrast and illumination parameters of a first image and a second image. The first and second image appearing visually similar to a human eye despite different pixel intensities representing a same area in the first and second image. The processor determines one or more normalized parameters using the one or more contrast and illumination parameters of the first and second image. Further, the processor determines normalized pixel intensity values of the second image based on the one or more normalized parameters and a normalized image is generated by transforming the second image with respect to the first image, using the normalized pixel intensity values.

In an embodiment, a system comprising an imaging device, a display unit and an image processing apparatus is disclosed. The imaging device is configured to capture a first image and a second image. The display unit is configured to apply a first window level value and first window width to the first image and a second window level and a second window width to the second image such that the first image and the second image appear visually similar on the display unit. The image processing apparatus is configured to determine a normalized slope value based on window width value of the first and the second image. Further, the image processing apparatus determines a normalized intercept value based on the window level value of the first and second image, the window width value of the first and second image and the highest displayed pixel intensity value. Thereafter, the image processing apparatus determines normalized pixel intensity values of the second image based on the normalized slope and the normalized intercept value and further generates the normalized image by transforming the second image with respect to the first image using the normalized pixel intensity values of the second image.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The novel features and characteristic of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

Figure 1:
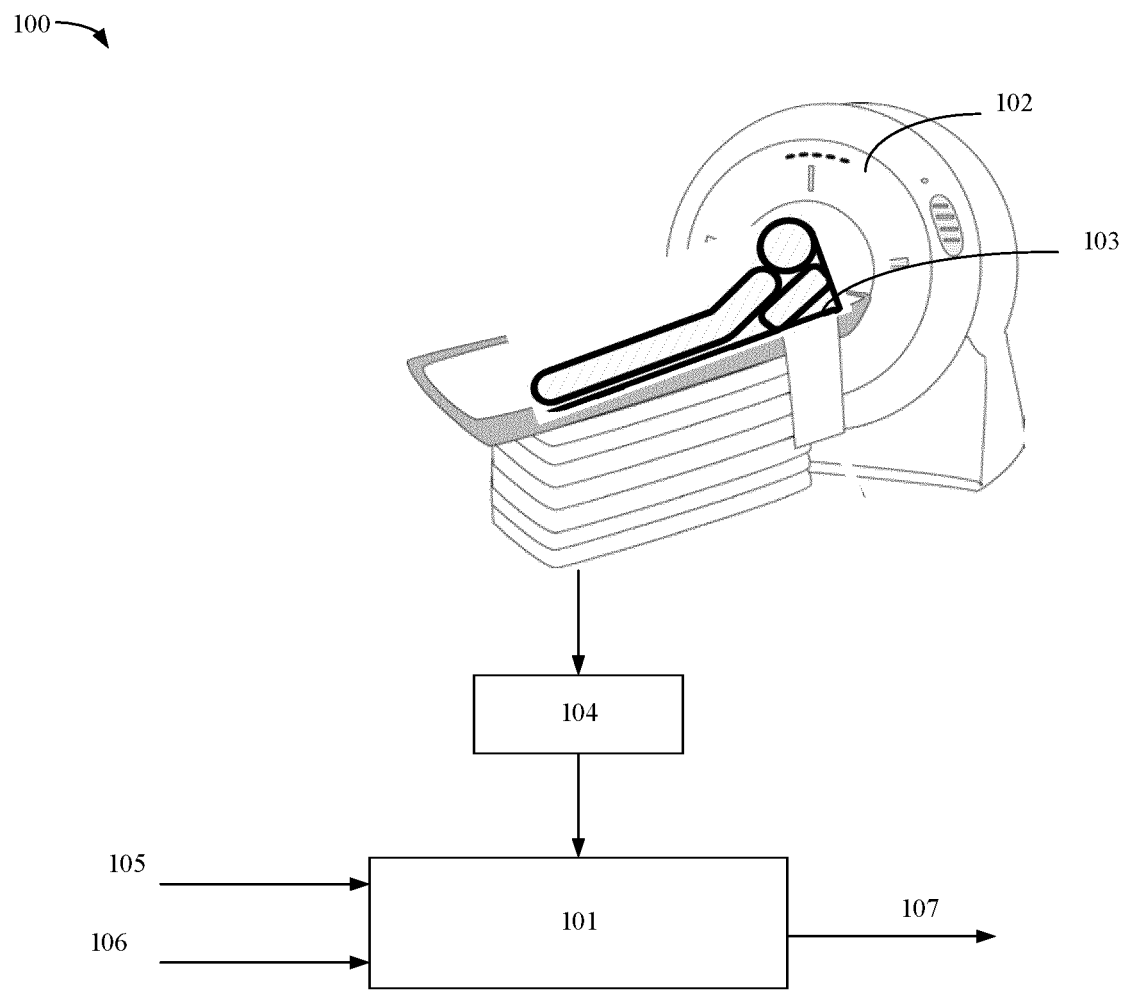
FIG. 1 is an illustration of a block diagram for normalizing pixel intensities of images, in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION OF EMBODIMENTS

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure relate to normalizing pixel intensity values of images. Qualitative images which have to be compared need to have actual pixel intensity values in a suitable range. The 'actual' pixel intensity values for an image may be considered to be the intensity values that are generated and/or stored in image data for the image. For example, the actual pixel intensity values may form part of or be stored in digital image data, such as DICOM (Digital Imaging and Communications in Medicine) image data. Generally, the qualitative images to be compared are made to appear visually similar by adjusting display settings. Thus, the images appear visually similar because the displayed pixel intensities are the same or similar. Using the relation between display settings of the qualitative images, the present disclosure normalizes pixel intensity values of the qualitative images, for enabling comparison of the images by any image processing apparatus.

FIG. 1 is an illustration of a block diagram of a system (100) for normalizing pixel intensities of images, in accordance with some embodiments of the present disclosure. As shown in FIG. 1, the system (100) comprises an imaging unit (102), two images, viz., a first image ($I_a$) (105) and a second image ($I_b$) (106) input to an image processing apparatus (101), a subject (103) and a display unit (104). In an embodiment, the imaging unit (102) can be a camera, a Magnetic Resonance Imaging (MRI) device, a Computed Tomography (CT) device or any other device capable of imaging a patient (104). The first image and the second image are further denoted without part number for simplicity. However, it should be apparent to a person skilled in the art that the part numbers (105 and 106) in FIG. 1 refers to the first image and the second image respectively. In one embodiment, the first image ($I_a$) and the second image ($I_b$) which appear visually similar to a radiologist/lab technician may be captured by a same imaging unit. In one embodiment, the first image ($I_a$) and the second image ($I_b$) which appear visually similar to a radiologist/lab technician may be captured using different imaging units. In a further embodiment, the first image ($I_a$) and the second image ($I_b$) may be captured by different imaging units of a similar/same modality. For example, the first image ($I_a$) may be captured using a first MRI scanner and the second image ($I_b$) may be captured using a second MRI scanner. In another embodiment, the first image ($I_a$) and the second image ($I_b$) may be captured by different imaging units of different modality. For example, the first image ($I_a$) may be captured using an MRI scanner and the second image ($I_b$) may be captured using a CT scanner. In such a case, parameters of the MRI scanner may be adjusted such that the first image ($I_a$) captured using the MRI scanner appears visually similar/same as the second image ($I_b$) captured by the CT scanner. In one embodiment, the first image ($I_a$) and the second image ($I_b$) are captured at different time. In one embodiment, when the imaging unit (102) is a camera, the first image ($I_a$) and the second image ($I_b$) may represent for example skin of the subject (103), an eye of the subject (103), and the like. In one embodiment, when the imaging unit (102) is the MRI device, the first image ($I_a$) and the second image ($I_b$) may represent for example an organ of the subject (103), tissue of the subject (103) and bones of the subject (103). In one embodiment, when the imaging unit (102) is the CT device, the first image ($I_a$) and the second image ($I_b$) may represent for example an organ of the subject (103), tissue of the subject (103) and bones of the subject (103), blood vessels of the subject (103).

In an embodiment, the first image ($I_a$) and the second image ($I_b$) may represent a same area/point of an object. In an embodiment the first image ($I_a$) and the second image ($I_b$) may represent a region of a subject, such as a tissue of the subject, an organ of the subject. In an embodiment, pixel intensity values ($X_a$) of the first image ($I_a$) and pixel intensity values ($X_b$) the second image ($I_b$) may be different while the first image ($I_a$) and the second image ($I_b$) appear visually similar on a display unit (104). In an embodiment, the images may appear similar for a user/laboratory technician viewing the first image ($I_a$) and the second image ($I_b$) on the display unit (104) as a result of combination of the actual pixel intensities and one or more contrast and illumination parameters of the object in the first image ($I_a$) and second image ($I_b$). In an embodiment, displayed pixel intensity values ($Y_a$) of the first image ($I_a$) is equal to displayed pixel intensity values ($Y_b$) of the second image ($I_b$). In a further embodiment, the displayed pixel intensity values ($Y_a$) and ($Y_b$) are received by the image processing apparatus from the display unit (104).

In an embodiment, the displayed pixel intensity values ($Y_a$) of the first image ($I_a$) and the displayed pixel intensity values ($Y_b$) of the second image ($I_b$) vary with respective actual pixel intensity values ($X_a$ and $X_b$). In some examples, the displayed pixel intensity values of the first image and/or the second image comprise pixel intensity values displayed on the display unit. As used herein, the actual pixel intensity values ($X_a$ and $X_b$) refer to pixel intensity values generated and/or stored by the image processing apparatus (101). As used herein the displayed pixel intensity values ($Y_a$ and $Y_b$) refer to pixel intensity values displayed on the display unit (104). For example, the displayed pixel intensity may comprise the intensities of pixels that an image viewer displays on the display unit (e.g. a monitor), and this may depend on the range of intensities that the image viewer is capable of displaying (e.g. 256 colors ranging from 0: black to 255: white).

In an embodiment, the one or more contrast and illumination parameters of the first image ($I_a$) and the second image ($I_b$) may include, but are not limited to, hue, saturation, contrast, brightness, Gamma, and combination thereof. In some embodiments, one or more illumination parameters may comprise an illuminance (e.g. an illuminance measured in terms of HSI (hue, saturation, intensity), HSL (hue, saturation, lightness) and HSV (hue, saturation, value) or HSB (hue, saturation, brightness)). In other embodiments, the one or more contrast and illumination parameters may comprise parameters other than those mentioned herein. In general, the one or more contrast and illumination parameters may comprise any suitable contrast and illumination parameters that can be normalized and used to determine normalized pixel intensity values of images.

In an embodiment, the imaging unit (102) may communicate with the image processing apparatus (101) through a communication network (not shown). The imaging unit (102) may be disposed in communication with the communication network via a network interface (not shown). The network interface may employ connection protocols including, without limitation, direct connect, Ethernet (e.g., twisted pair 10/100/1000 Base T), transmission control protocol/Internet protocol (TCP/IP), token ring, IEEE 802.11a/b/g/n/x, etc. The communication network may include, without limitation, a direct interconnection, wired connection, e-commerce network, a peer to peer (P2P) network, Local Area Network (LAN), Wide Area Network (WAN), wireless network (e.g., using Wireless Application Protocol (WAP)), the Internet, Wireless Fidelity (Wi-Fi), etc.

In an embodiment, the image processing apparatus (101) generates normalizes the actual pixel intensity values ($X_a$ or $X_b$) for enabling meaningful comparison between the first and the second image ($I_a$ and $I_b$). The normalized pixel intensity values may inherently form a normalized image ($I_a'$ or $I_b'$) (107). Further explanation is provided without referring to part number (107). However, it should be apparent to a person of ordinary skill that the part number (107) refers to normalized image ($I_a'$ or $I_b'$).

Figure 2:
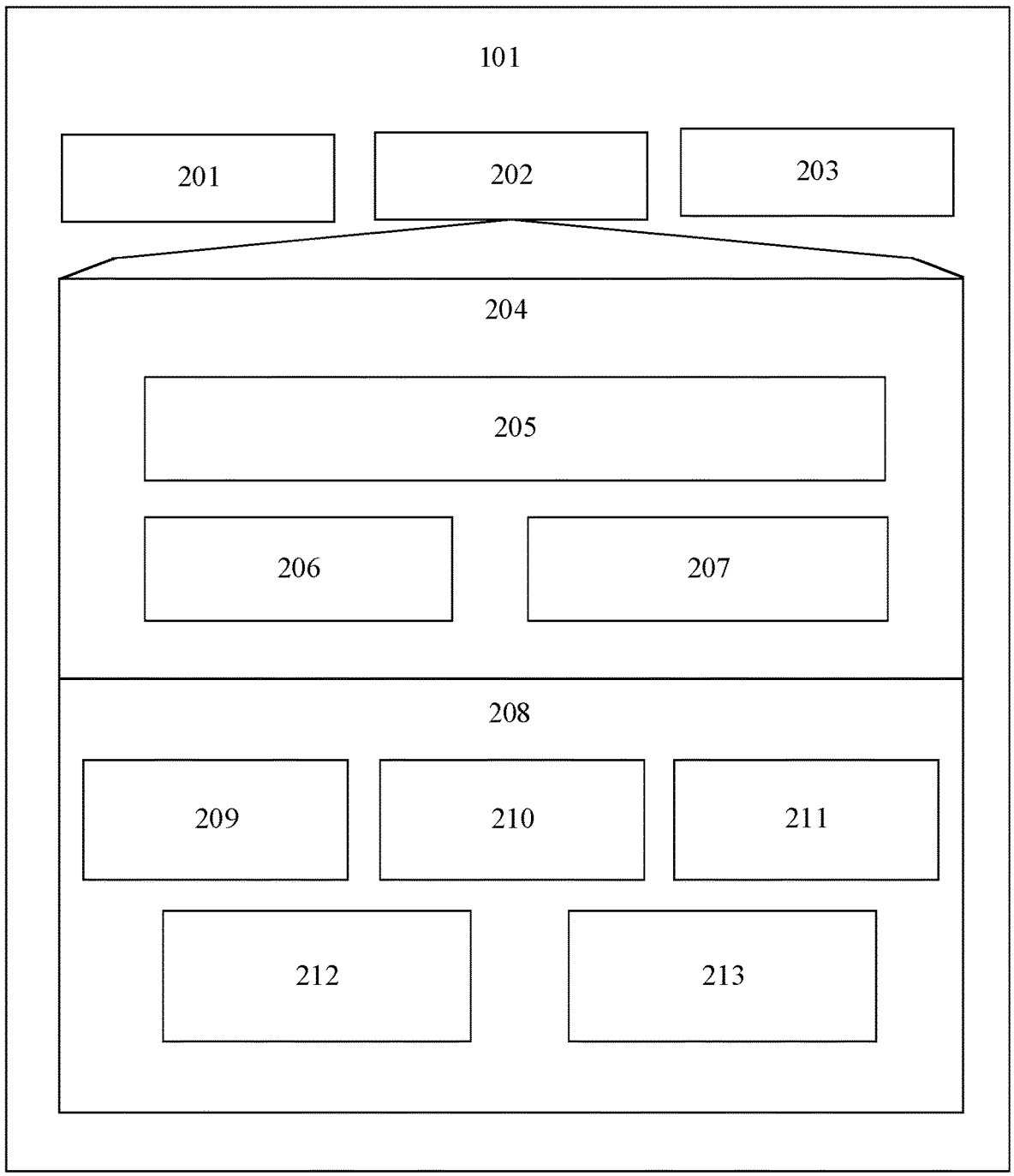
FIG. 2 is an exemplary illustration of internal structure of an image processing apparatus configured to normalize pixel intensities of images, in accordance with some embodiments of the present disclosure.

FIG. 2 is an exemplary illustration of internal structure of an image processing apparatus (101) configured to normalize pixel intensities of images, in accordance with some embodiments of the present disclosure. The image processing apparatus (101) may include at least one Central Processing Unit ("CPU" or "processor") (203) and a memory (202) storing instructions executable by the at least one processor (203). The processor (203) may comprise at least one data processor for executing program components for executing user or system-generated requests. The memory (202) is communicatively coupled to the processor (203). The image processing apparatus (101) further comprises an Input/Output (I/O) interface (201). The I/O interface (201) is coupled with the processor (203) through which an input signal or/and an output signal is communicated.

In an embodiment, data (204) may be stored within the memory (202). The data (204) may include, for example, contrast and illumination parameters (205), displayed pixel intensity value (206) and other data (207).

In an embodiment, the contrast and illumination parameters (205) may include but not limited to hue, saturation, contrast, brightness, Gamma, or combinations thereof.

In an embodiment, the highest displayed pixel intensity value (206) (herein denoted as G) may be the highest pixel intensity value displayed on the display unit (104). In an embodiment, the highest displayed pixel intensity (G) may vary depending on the display unit (104). In an embodiment, the highest displayed pixel intensity (G) may be determined using specification sheet of the display unit (104). In an embodiment, the other data (207) may include parameters related to the imaging unit (102) and a timestamp associated with the first image ($I_a$) and the second image ($I_b$).

In an embodiment, the data (204) in the memory (202) is processed by modules (208) of the image processing apparatus (101). As used herein, the term module refers to an Application Specific Integrated Circuit (ASIC), an electronic circuit, a field-programmable gate arrays (FPGA), Programmable System-on-Chip (PSoC), a combinational logic circuit, and/or other suitable components that provide the described functionality. The modules (208) when configured with the functionality defined in the present disclosure will result in a novel hardware.

In one implementation, the modules (208) may include, for example, a communication module (209), a normalized slope determination module (210), a normalized intercept determination module (211), a normalized pixel intensity determination module (212) and other modules (213). It will be appreciated that such aforementioned modules (209) may be represented as a single module or a combination of different modules.

In one embodiment, the communication module (209) may be configured to receive the first image ($I_a$) and the second image ($I_b$) from the imaging unit (102) via the communication network. In an embodiment, the communication module (209) may be configured to pre-process the first image ($I_a$) and the second image ($I_b$). In an embodiment, pre-processing can include, but is not limited to, image enhancement, noise reduction, image compression, etc. The communication module (209) may further receive actual pixel intensity values ($X_a$, $X_b$), the highest displayed pixel intensity value (G), window level values ($L_a$, $L_b$) and window width values ($W_a$, $W_b$) of the first image ($I_a$) and the second image ($I_b$). In an embodiment, the displayed pixel intensity values ($Y_a$, $Y_b$) may vary linearly with the respective actual pixel intensity values ($X_a$, $X_b$).

In an embodiment, the normalized slope determination module (210) may be configured to determine a normalized slope ($M_f$) based on window width value ($W_a$, $W_b$) of the first image ($I_a$) and the second image ($I_b$).

In an embodiment, the normalized intercept determination module (211) may be configured to determine a normalized intercept value ($C_f$) based on, the window level value ($L_a$) of the first image ($I_a$), the window level value ($L_b$) of the second image ($I_b$), the window width value ($W_a$) of the first image ($I_a$), the window width value ($W_b$) of the second image ($I_b$) and the highest displayed pixel intensity value (G).

In an embodiment, the normalized slope value ($M_f$) and the normalized intercept value ($C_f$) may be determined to analyse a relationship between displayed pixel intensity values ($Y_a$, $Y_b$) and the actual pixel intensity values ($X_a$, $X_b$) of respective images ($I_a$, $I_b$).

In an embodiment, functions of the normalized slope determination module (210) and the normalized intercept determination module (211) may be combined and a single module may perform the functions of the normalized slope determination module (210) and the normalized intercept determination module (211). The normalized slope ($M_f$) and the normalized intercept ($C_f$) may be together represented as one or more normalized parameters. In some embodiments, the one or more normalized parameters may comprise one or more of: the highest displayed pixel intensity value (G), the window level value ($L_a$, $L_b$) and the window width value ($W_a$, $W_b$), of the first image ($I_a$) and/or of the second image ($I_b$).

In an embodiment, the normalized pixel intensity determination module (212) is configured to determine normalized pixel intensity values ($X_b'$) of the second image ($I_b$) based on the normalized slope ($M_f$) and the normalized intercept ($C_f$). In an embodiment, the normalized pixel intensity values ($X_b'$) may represent the actual pixel intensity values ($X_b$) of the second image ($I_b$) in a range comparable with the actual pixel intensity values ($X_a$) of the first image ($I_a$). In an embodiment, the normalized pixel intensity values ($X_b$) is obtained by transforming the actual pixel intensity values ($X_b$) with respect to the actual pixel intensity values ($X_a$). In an embodiment, the normalized pixel intensity determination module (212) may determine the normalized pixel intensity values ($X_b$) using the one or more normalized parameters. In an embodiment, normalized pixel intensity values ($X_b'$) forms a normalized image ($I_b'$). The normalized image ($I_b'$) may be used for meaningful comparison with the first image ($I_a$).

In an embodiment, the other modules (213) may include a classification module, a labelling module, and a segmentation module.

In an embodiment, the classification module may classify the first image ($I_a$) and the second image ($I_b$) into one or more predefined categories. For example, the classification module can be used to classify the first image ($I_a$) and the second image ($I_b$) as comprising tumour cells. Likewise, the classification module can classify the first image ($I_a$) and the second image ($I_b$) into different categories.

In an embodiment, the segmentation module can be configured to segment the first image ($I_a$) and the second image ($I_b$) based on comparison of the second image ($I_b$) with the first image ($I_a$). For example, the segmentation module can segment an image of a blood smear based on blood concentration.

In an embodiment, the labelling module can be configured to label the first image ($I_a$) and the second image ($I_b$) based on the comparison. For example, the labelling module can label a patch of image as comprising Red Blood Cells (RBCs).

Figure 3:
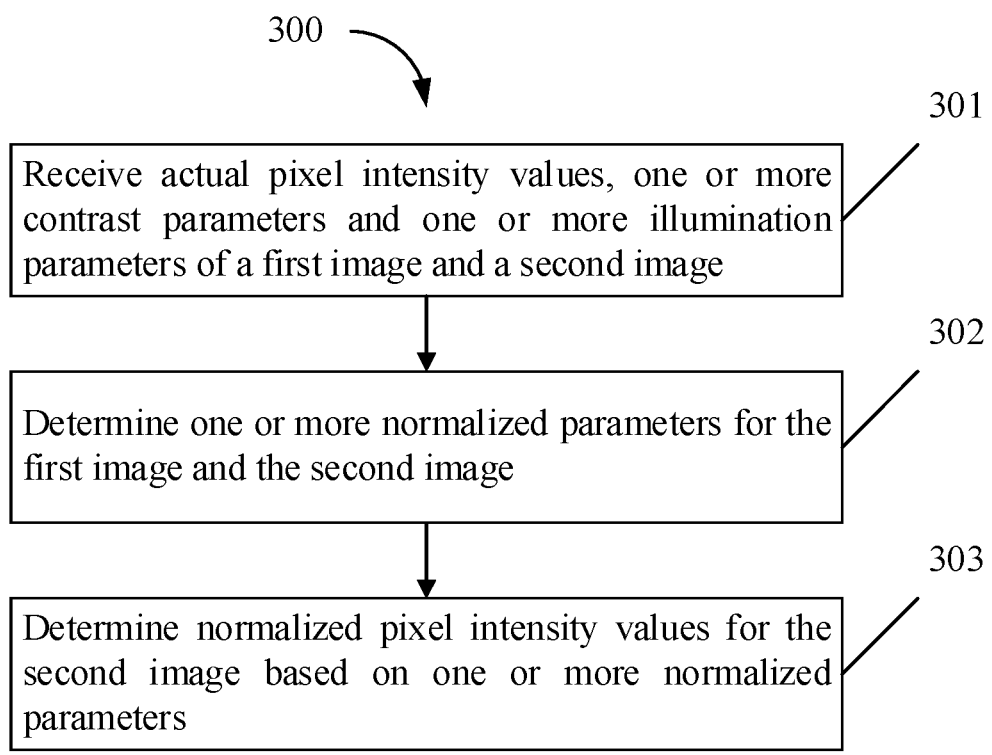
FIG. 3 is a flowchart illustrating exemplary method steps for normalizing pixel intensities of images, in accordance with some embodiments of the present disclosure.

FIG. 3 is a flowchart illustrating exemplary method steps for normalizing pixel intensities of images, in accordance with some embodiments of the present disclosure.

As illustrated in FIG. 3, the method (300) may comprise one or more steps for normalizing pixel intensity of images, in accordance with some embodiments of the present disclosure. The method (300) may be described in the general context of computer executable instructions. Generally, computer executable instructions can include routines, programs, objects, components, data structures, procedures, modules, and functions, which perform particular functions or implement particular abstract data types.

The order in which the method (300) is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At step 301, receiving by the communication module (209), the first image ($I_a$) and the second image ($I_b$) from the imaging unit (102). As described herein, the first image ($I_a$) and the second image ($I_b$) may be received over the communication network. In an embodiment, the first image ($I_a$) and the second image ($I_b$) appear similar. In an embodiment, window settings like window width ($W_a$, $W_b$) and window level ($L_a$, $L_b$) are applied on respective images to make the first image ($I_a$) and the second image ($I_b$) appear similar. In one embodiment, the window settings are applied by the display unit (104).

At step 302, determining by the single module (combination of normalized slope determination module (210) and normalized intercept determination module (211)) one or more normalized parameters for the first image ($I_a$) and the second image ($I_b$). A person skilled in the art should appreciate that although not mentioned explicitly, any parameters apart from window parameters may be covered within the scope of this disclosure.

At step 303, determining by the normalized pixel intensity determination module (212), normalized pixel intensity values ($X_b'$) of the second image ($I_b$) based on the one or more normalized parameters. In an embodiment, the normalized pixel intensity values ($X_b'$) forms the normalized image ($I_b'$). The normalized image ($I_b'$) may have pixel intensity values ($X_b'$) that lie in a comparable range with the actual pixel intensity values ($X_a$) of the first image ($I_a$).

Figure 4:
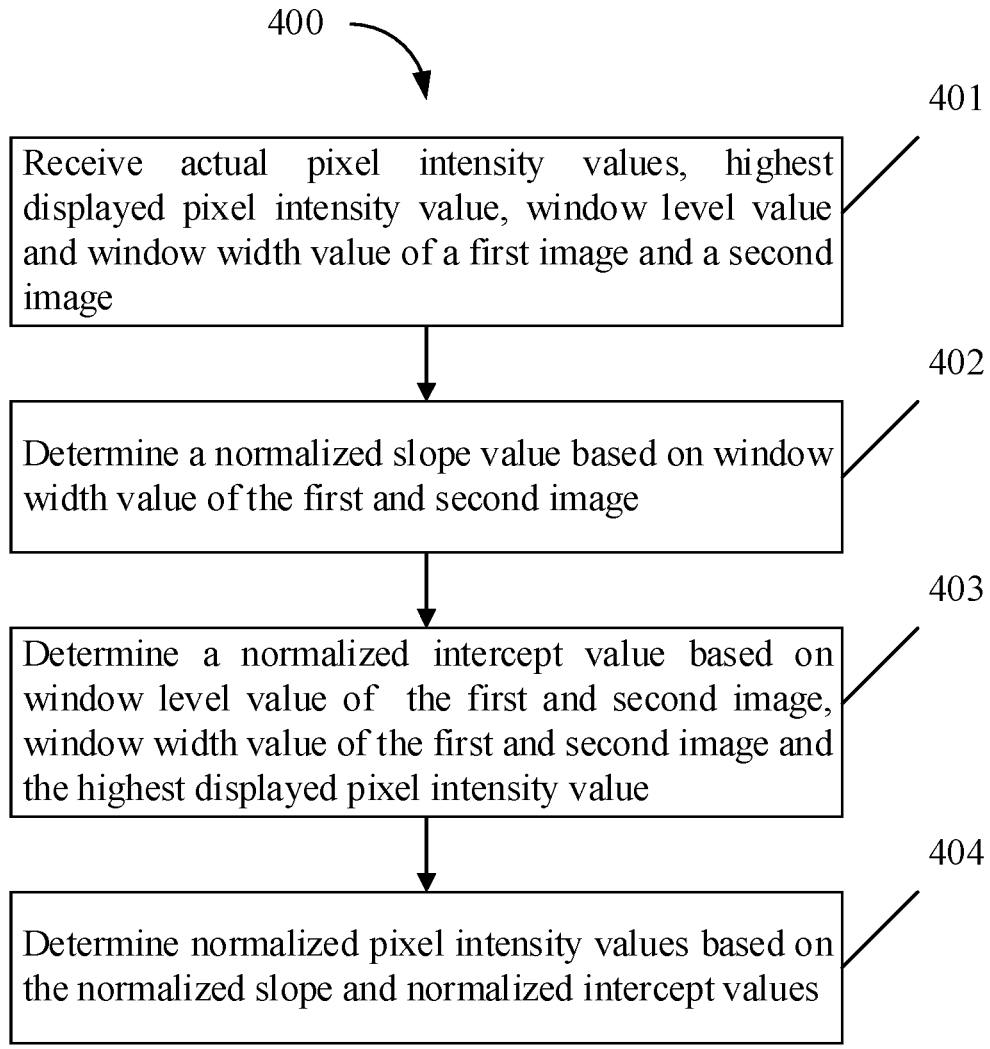
FIG. 4 is a flowchart illustrating detailed method steps for normalizing pixel intensities of images, in accordance with some embodiments of the present disclosure.

Following description describes the method steps of 300 in detail. Reference is now made to FIG. 4.

At step 401, the communication module (209) receives the actual pixel intensity values ($X_a$, $X_b$), highest displayed pixel intensity (G), window level value ($L_a$, $L_b$) and window width value ($W_a$, $W_b$) for the first and second images ($I_a$, $I_b$). In one embodiment, the first and the second images ($I_a$, $I_b$) may be captured using different modalities, for example, first image ($I_a$) is captured using first settings in MRI device and second image ($I_a$) is captured using second settings in MRI device. In another embodiment, the first and the second images ($I_a$, $I_b$) may be images of a same area of a subject/patient but captured at different time. Hence, there may be variations in the first and the second images ($I_a$, $I_b$). Window settings (window width and Window level) may be applied on the first and the second images ($I_a$, $I_b$) to make the images appear visually similar on the display unit (104). Such images that appear visually similar may be viewed by radiologists/lab technicians to compare the images. In an embodiment, the window width values ($W_a$, $W_b$) may indicate contrast settings and window level values ($L_a$, $L_b$) may indicate brightness settings.

For an image I, windowing (window level (L) and window width (W)) is a linear contrast stretching which can be expressed as a linear equation as shown in equation 1:

$$y = mx + c \quad (1)$$

where:
y=displayed/interpreted pixel intensity of an image displayed under window settings W and L;
x=actual pixel intensity of an image;
m=slope of the linear equation; and
c=intercept;

Thus, for the first image ($I_a$) and the second image ($I_b$), the $Y_a$ and $Y_b$ can be represented in a form of a linear equation as shown below:

$$Y_a = M_a X_a + C_a \quad (2)$$

$$Y_b = M_b X_b + C_b \quad (3)$$

At step 402, determining by the normalized slope determination module (210) a normalized slope ($M_f$) based on the window width ($W_a$, $W_b$) of the first and the second images ($I_a$, $I_b$). In general, a slope can be determined for a linearly varying displayed pixel intensity value (y) with respect to the actual pixel intensity value (x) expressed in equation 1 as follows:

$$m = G/W \quad (4)$$

and $$c = -m[W + L/2] \quad (5)$$

Now considering equations, 2 and 3, $Y_a = Y_b$ as images $I_a$ and $I_b$ appear visually similar. In an embodiment, the second image ($I_b$) can be transformed to be compared with the first image ($I_a$). Alternatively, the first image ($I_a$) can be transformed to be compared with the second image ($I_b$). For illustration, let us consider that the second image ($I_b$) is transformed. Hence, $X_b$ can be represented with respect to $X_a$ as shown:

$$M_a X_a + C_a = M b X_b + C_b \quad (6)$$

Substituting for m and c as shown in equations 4 and 5 and upon further solving equations 6, the normalized slope ($M_f$) is determined using the below equation:

$$M_f = W_a / W_b \quad (7)$$

A person skilled in the art should appreciate that when ($I_a$) is transformed according to ($I_b$), the $M_f$ can be determined using $W_b/W_a$.

While, in some embodiments, transforming the second image with respect to the first image may comprise performing a linear contrast stretching transformation, in some embodiments, the second image may be transformed with respect to the first image in a geometrical representation domain (e.g. using a geometrical transformation), a pixel intensity distribution domain, a Fourier domain, or any other domain.

Figure 5:
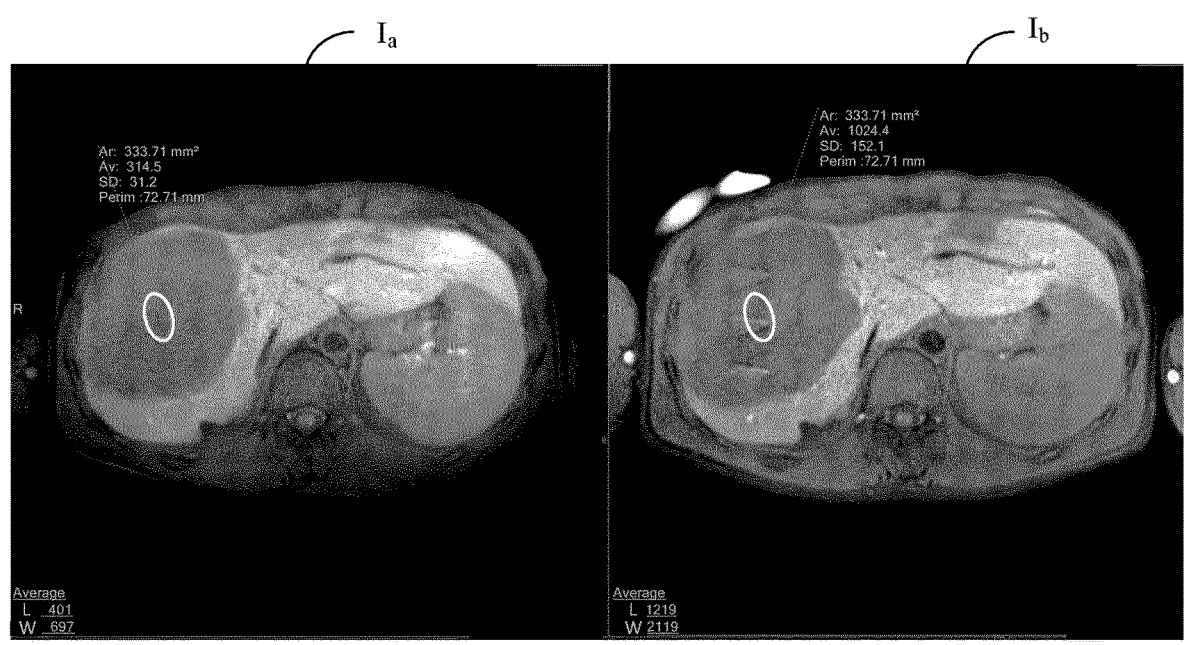
FIG. 5 shows exemplary images of same area in the images appearing visually similar, in accordance with some embodiments of the present disclosure.

Reference is now made to FIG. 5 which shows exemplary images of same area in the images appearing visually similar, in accordance with some embodiments of the present disclosure. As seen, the first image ($I_a$) and the second images ($I_b$) appear similar on the display unit (104). Further, from the FIG. 5, it can be noted that the first image ($I_a$) is associated with the widow settings of $L_a$=401 and $W_a$=697 while the second image ($I_b$) is associated with the window settings of $L_b$=1219 and $W_b$=2119. Thus, the window settings are applied on the first and the second images ($I_a$, $I_b$) such that the two images appear visually similar/same on the display unit (104). Further, an area (shown by a circular selection) in the first and the second image ($I_a$, $I_b$) may be considered by a radiologist/lab technician for comparison.

Table 1a and 1b show exemplary pixel intensity values for the area in the images ($I_a$, $I_b$), in accordance with some embodiments of the present disclosure. In an embodiment, for the same area in the first and the second image ($I_a$, $I_b$), actual pixel intensity values ($X_a$, $X_b$) are shown in Table 1a and Table 1b respectively. As seen, the actual pixel intensity values ($X_a$, $X_b$) vary and are not in a common range for comparison. The difference in the actual pixel intensity values ($X_a$, $X_b$) can occur due to various reasons as described earlier in the disclosure.

TABLE 1a

| | | | | | | | | | | | | | |
|---|---|---|---|---|---|---|---|---|---|---|---|---|---|
| 279.09 | 294.94 | 266.4 | 291.77 | 320.31 | 336.17 | 345.69 | 348.86 | 345.69 | 342.51 | 364.71 | 358.37 | 361.54 | 380.57 |
| 301.29 | 294.94 | 272.74 | 301.29 | 313.97 | 348.86 | 352.03 | 339.34 | 345.69 | 339.34 | 348.86 | 345.69 | 358.37 | 377.4 |
| 317.14 | 282.26 | 279.09 | 301.29 | 313.97 | 342.51 | 342.51 | 342.51 | 329.83 | 313.97 | 333 | 345.69 | 355.2 | 367.89 |
| 294.94 | 294.94 | 288.6 | 294.94 | 310.8 | 320.31 | 342.51 | 342.51 | 323.49 | 326.66 | 342.51 | 348.86 | 345.69 | 361.54 |
| 269.57 | 323.49 | 317.14 | 304.46 | 313.97 | 329.83 | 364.71 | 352.03 | 339.34 | 348.86 | 345.69 | 358.37 | 342.51 | 352.03 |
| 294.94 | 313.97 | 307.63 | 313.97 | 317.14 | 345.69 | 364.71 | 352.03 | 339.34 | 336.17 | 352.03 | 364.71 | 352.03 | 342.51 |
| 307.63 | 291.77 | 291.77 | 323.49 | 317.14 | 348.86 | 358.37 | 361.54 | 348.86 | 339.34 | 377.4 | 361.54 | 348.86 | 333 |
| 279.09 | 298.11 | 329.83 | 345.69 | 336.17 | 348.86 | 358.37 | $ 74.23 | 374.23 | 358.37 | 361.54 | 339.34 | 345.69 | 352.03 |
| 288.6 | 323.49 | 348.86 | 358.37 | 367.89 | 352.03 | 345.69 | 361.54 | 383.74 | 361.54 | 333 | 323.49 | 355.2 | 390.09 |
| 333 | 336.17 | 320.31 | 326.66 | 358.37 | 367.89 | 361.54 | 367.89 | 377.4 | 364.71 | 355.2 | 348.86 | 361.54 | 393.26 |
| 339.34 | 336.17 | 310.8 | 307.63 | 336.17 | 380.57 | 402.77 | 386.91 | 371.06 | 367.89 | 364.71 | 371.06 | 371.06 | 374.23 |
| 333 | 348.86 | 326.66 | 329.83 | 364.71 | 361.54 | 355.2 | 367.89 | 361.54 | 361.54 | 348.86 | 342.51 | 364.71 | 364.71 |
| 339.34 | 364.71 | 336.17 | 345.69 | 383.74 | 339.34 | 301.29 | 355.2 | 364.71 | 367.89 | 371.06 | 313.97 | 329.83 | 367.89 |
| 367.89 | 364.71 | 345.69 | 352.03 | 355.2 | 333 | 329.83 | 371.06 | 374.23 | 364.71 | 380.57 | 339.34 | 320.31 | 364.71 |
| 367.89 | 345.69 | 336.17 | 367.89 | 361.54 | 333 | 358.37 | 377.4 | 355.2 | 333 | 348.86 | 364.71 | 329.83 | 336.17 |
| 320.31 | 326.66 | 317.14 | 355.2 | 377.4 | 342.51 | 352.03 | 361.54 | 329.83 | 313.97 | 329.83 | 345.69 | 329.83 | 317.14 |
| 313.97 | 323.49 | 323.49 | 326.66 | 333 | 348.86 | 355.2 | 355.2 | 345.69 | 336.17 | 336.17 | 329.83 | 326.66 | 342.51 |
| 352.03 | 323.49 | 352.03 | 345.69 | 301.29 | 323.49 | 352.03 | 339.34 | 361.54 | 358.37 | 345.69 | 336.17 | 323.49 | 342.51 |
| 336.17 | 323.49 | 374.23 | 383.74 | 323.49 | 310.8 | 333 | 326.66 | 345.69 | 355.2 | 342.51 | 336.17 | 326.66 | 317.14 |
| 326.66 | 355.2 | 383.74 | 374.23 | 345.69 | 336.17 | 333 | 333 | 339.34 | 336.17 | 333 | 333 | 336.17 | 333 |
| 371.06 | 386.91 | 371.06 | 342.51 | 342.51 | 348.86 | 336.17 | 339.34 | 326.66 | 313.97 | 329.83 | 326.66 | 329.83 | 336.17 |
| 371.06 | 355.2 | 320.31 | 326.66 | 333 | 317.14 | 323.49 | 342.51 | 326.66 | 301.29 | 329.83 | 326.66 | 317.14 | 313.97 |
| 339.34 | 320.31 | 291.77 | 320.31 | 339.34 | 310.8 | 320.31 | 348.86 | 329.83 | 310.8 | 336.17 | 333 | 307.63 | 323.49 |
| 326.66 | 333 | 333 | 326.66 | 348.86 | 345.69 | 342.51 | 339.34 | 317.14 | 320.31 | 326.66 | 317.14 | 307.63 | 323.49 |
| 333 | 342.51 | 361.54 | 348.86 | 333 | 342.51 | 339.34 | 329.83 | 326.66 | 310.8 | 288.6 | 285.43 | 317.14 | 301.29 |
| 355.2 | 326.66 | 320.31 | 355.2 | 326.66 | 304.46 | 301.29 | 323.49 | 345.69 | 320.31 | 291.77 | 279.09 | 307.63 | 301.29 |
| 358.37 | 326.66 | 304.46 | 329.83 | 298.11 | 294.94 | 298.11 | 345.69 | 317.14 | 342.51 | 336.17 | 288.6 | 266.4 | 294.94 |
| 339.34 | 323.49 | 313.97 | 320.31 | 307.63 | 329.83 | 339.34 | 310.8 | 317.14 | 323.49 | 320.31 | 291.77 | 247.37 | 275.91 |
| 329.83 | 288.6 | 320.31 | 348.86 | 323.49 | 348.86 | 339.34 | 336.17 | 339.34 | 279.09 | 269.57 | 288.6 | 266.4 | 285.43 |
| 326.66 | 272.74 | 333 | 352.03 | 307.63 | 313.97 | 285.43 | 294.94 | 30129 | 260.06 | 260.06 | 266.4 | 275.91 | 298.11 |
| 320.31 | 288.6 | 317.14 | 304.46 | 288.6 | 288.6 | 272.74 | 269.57 | 269.57 | 260.06 | 260.06 | 247.37 | 269.57 | 298.11 |
| 294.94 | 291.77 | 291.77 | 279.09 | 310.8 | 313.97 | 294.94 | 285.43 | 294.94 | 279.09 | 253.71 | 247.37 | 269.57 | 285.43 |

TABLE 1b

| | | | | | | | |
|---|---|---|---|---|---|---|---|
| 0.17 | 813,322 | 779,897 | 869.029 | 857.887 | 1002.725 | 1047.291 | 947.018 |
| 835,604 | 779,897 | 768,756 | 846,746 | 880.17 | 1002.725 | 1013.867 | 947,018 |
| 746,473 | 768,756 | 835,604 | 846,746 | 846,746 | 913,594 | 991.584 | 1002.725 |
| 724.19 | 880.17 | 913.594 | 902,453 | 880.17 | 958.16 | 1047.291 | 1058.432 |
| 846,746 | 947,018 | 846,746 | 913.594 | 980,442 | 1013.867 | 1047.291 | 1036.149 |
| 980,442 | 857,887 | 735,332 | 846,746 | 958.16 | 980,442 | 1058,432 | 1002.725 |
| 980,442 | 768,756 | 768.756 | 869.029 | 913.594 | 991,584 | 1080.715 | 1036.149 |
| 924,736 | 835,604 | 891.311 | 924,736 | 1002.725 | 1069,574 | 1058,432 | 1058,432 |
| 880.17 | 891.311 | 913,594 | 902.453 | 1036.149 | 1080.715 | 1002.725 | 1058,432 |
| 891.311 | 880.17 | 869.029 | 880.17 | 980,442 | 1025.008 | 980,442 | 1013.867 |
| 924,736 | 913,594 | 880.17 | 958.16 | 980,442 | 1025.008 | 1036.149 | 935,877 |
| 935,877 | 991.584 | 969.301 | 958.16 | 1025.008 | 1069,574 | 1069,574 | 947,018 |
| 958.16 | 980,442 | 1013.867 | 924,736 | 991,584 | 1091,856 | 1058,432 | 1002.725 |
| 991,584 | 947,018 | 1002.725 | 958.16 | 991,584 | 1125.281 | 1080.715 | 1013.867 |
| 991,584 | 969.301 | 1013.867 | 980,442 | 1036.149 | 1147.563 | 1125.281 | 1125.281 |
| 969.301 | 1002.725 | 1025,008 | 1002.725 | 991,584 | 1069,574 | 1158.705 | 1158.705 |
| 1036.149 | 1036.149 | 947,018 | 1036.149 | 980,442 | 1025.008 | 1180.988 | 1025.008 |
| 1080.715 | 1047.291 | 924,736 | 1058,432 | 1147.563 | 1091,856 | 1058,432 | 1069,574 |
| 1047.291 | 1036.149 | 1013.867 | 1058,432 | 1169,846 | 1080.715 | 1002.725 | 1214,412 |
| 1058.432 | 1058.432 | 1102.998 | 1013.867 | 947.018 | 1069.574 | 1114.139 | 1114.139 |
| 1091,856 | 1058,432 | 1125.281 | 969.301 | 924,736 | 1114.139 | 1091,856 | 958.16 |
| 1047.291 | 1002.725 | 1036.149 | 991,584 | 1080.715 | 1069,574 | 935,877 | 1013,867 |
| 1047.291 | 1047.291 | 991.584 | 1025.008 | 1102.998 | 1002.725 | 1002.725 | 1158.705 |
| 1069.574 | 1102.998 | 1091,856 | 1036.149 | 1069.574 | 1125.281 | 1125.281 | 1147,563 |
| 1069.574 | 1013.867 | 1125.281 | 1058,432 | 1158.705 | 1180.988 | 047.291 | 1058,432 |
| 1036.149 | 913.594 | 1047.291 | 1114.139 | 1158.705 | 1036.149 | 947.018 | 1058.432 |
| 969.301 | 924.736 | 1047.291 | 1114.139 | 1069.574 | 991.584 | 947.018 | 1047.291 |
| 1047.291 | 991.584 | 1091.856 | 1058,432 | 1025.008 | 1047.291 | 1025,008 | 1047.291 |
| 1180.988 | 1047.291 | 1114.139 | 1091,856 | 1047,291 | 1058,432 | 1080.715 | 1136,422 |
| 1125.281 | 1058,432 | 1136.422 | 1180.988 | 1102.998 | 1091,856 | 1114,139 | 1192.129 |
| 1069.574 | 1091,856 | 1180.988 | 1136,422 | 1047.291 | 1136,422 | 1114,139 | 1136,422 |
| 1136,422 | 1125.281 | 1147.563 | 1080.715 | 958.16 | 1080.715 | 1158.705 | 1147,563 |
| 1136,422 | 1091.856 | 1058.432 | 1102.998 | 1002.725 | 1080.715 | 1158.705 | 1147.563 |

| | | | | | | | |
|---|---|---|---|---|---|---|---|
| | | 980.442 | 991.584 | 980,442 | 1080.715 | 1102.998 | 991.584 |
| | | 991.584 | 1025.008 | 991.584 | 1058.432 | 1102.998 | 958.16 |
| | | 1058,432 | 1069.574 | 1036.149 | 1047.291 | 1036.149 | 1013.867 |
| | | 1114.139 | 1025.008 | 1013.867 | 1069.574 | 935.877 | 958.16 |
| | | 1036.149 | 969.301 | 935,877 | 1036.149 | 958.16 | 857,887 |
| | | 913,594 | 1002.725 | 1013.867 | 1002.725 | 991.584 | 969.301 |
| | | 969.301 | 1058,432 | 1114.139 | 991.584 | 935,877 | 1047.291 |
| | | 1069,574 | 1002.725 | 1002.725 | 991,584 | 958.16 | 958.16 |

TABLE 1b-continued

| | | | | | |
|---|---|---|---|---|---|
| 1036.149 | 891.311 | 891.311 | 1002.725 | 1036.149 | 991.584 |
| 991.584 | 913.594 | 991.584 | 1047.291 | 1058,432 | 1091.856 |
| 1002.725 | 1080.715 | 1080.715 | 1091.856 | 1036.149 | 1069.574 |
| 991.584 | 1102.998 | 1025.008 | 1069.574 | 1080.715 | 1091.856 |
| 969.301 | 1047.291 | 1058,432 | 1080.715 | 1158.705 | 1114.139 |
| 1013,867 | 1147,563 | 1169.846 | 1114.139 | 1169.846 | 1058,432 |
| 1102.998 | 1192.129 | 1180.988 | 1058,432 | 1091.856 | 1069.574 |
| 1114.139 | 1147,563 | 1102.998 | 1036.149 | 1013,867 | 1036.149 |
| 1080.715 | 1136.422 | 1013.867 | 1047.291 | 1036.149 | 958.16 |
| 1102.998 | 1058,432 | 969.301 | 958.16 | 1047.291 | 980,442 |
| 1102.998 | 969.301 | 969.301 | 891,311 | 980,442 | 924,736 |
| 1047.291 | 980,442 | 935.877 | 947.018 | 991.584 | 902,453 |
| 1047.291 | 1036.149 | 947,018 | 969.301 | 1025.008 | 1036.149 |
| 1080.715 | 1091.856 | 1036.149 | 1025.008 | 1036.149 | 1013.867 |
| 1091.856 | 1069.574 | 1102.998 | 1180.988 | 1136.422 | 935.877 |
| 1036.149 | 991.584 | 1102.998 | 1180.988 | 1136,422 | 991,584 |
| 1025.008 | 1036.149 | 1069.574 | 1058,432 | 1013.867 | 969.301 |
| 1147.563 | 1125.281 | 1002.725 | 1080.715 | 1036.149 | 935.877 |
| 1147,563 | 1102.998 | 1058,432 | 1180.988 | 1114.139 | 1025,008 |
| 1025.008 | 1080.715 | 1136.422 | 1102.998 | 1047.291 | 1036.149 |
| 1102.998 | 1114,139 | 1013.867 | 947,018 | 1002.725 | 1025.008 |
| 281.26 | 1069.574 | 891.311 | 1002.725 | 1025,008 | 958.16 |
| 1258.977 | 991,584 | 958.16 | 1180.988 | 1047.291 | 880.17 |
| 1203.27 | 1058,432 | 1036.149 | 1125.281 | 1002.725 | 980,442 |
| 1236,695 | 1169,846 | 1013.867 | 924,736 | 924,736 | 1069.5 |

Figure 6:
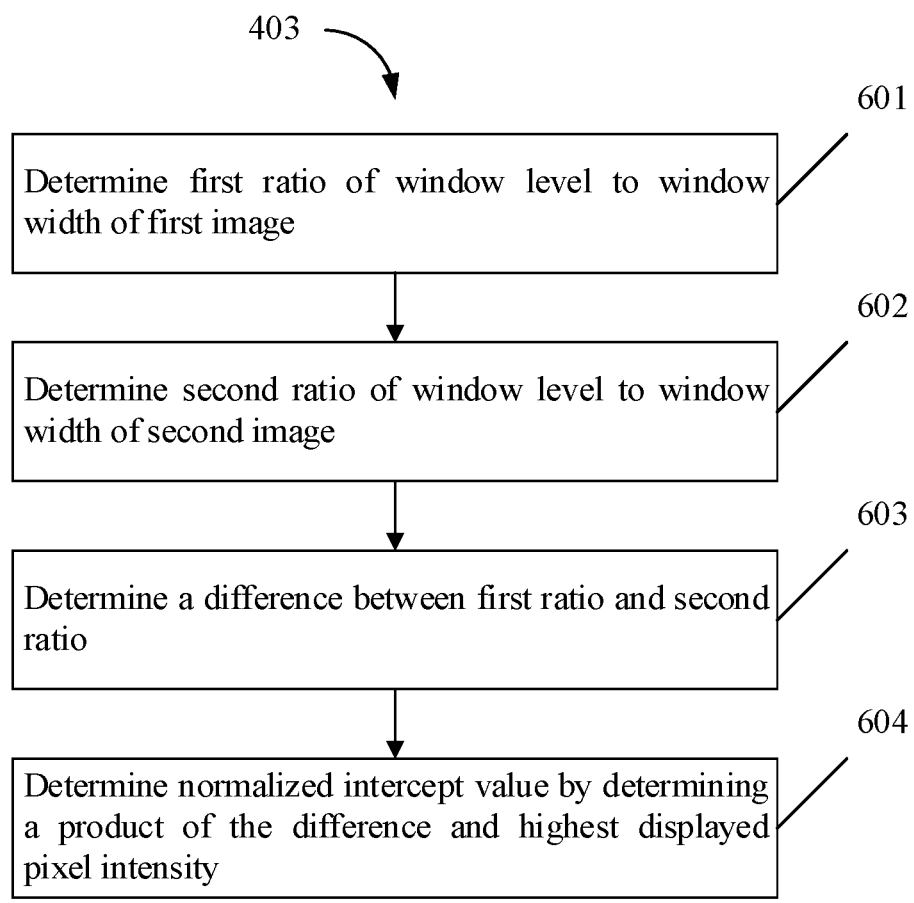
FIG. 6 is a flowchart illustrating exemplary method steps for determining normalized intercept value, in accordance with some embodiments of the present disclosure.

At step 403, determining, by the normalized intercept determination module (211), the normalized intercept value ($C_f$) based on the window level values ($L_a$, $L_b$) the window width values ($W_a$, $W_b$) and the highest displayed pixel intensity values (G) of the first and the second images ($I_a$, $I_b$). Reference is now made to FIG. 6 which is a flowchart illustrating exemplary method steps for determining normalized intercept value, in accordance with some embodiments of the present disclosure.

At step 601, determining by the normalized intercept determination module (211) a first ratio of window level value ($L_a$) to the window width value ($W_a$) of the first image ($I_a$). The first ratio can be denoted as:

$$R1 = L_a/W_a \quad (8)$$

At step 602, determining by the normalized intercept determination module (211) a second ratio of window level value ($L_b$) to the window width value ($W_b$) of the second image ($I_b$). The first ratio can be denoted as:

$$R2 = L_b/W_b \quad (9)$$

At step 603, determining by the normalized intercept determination module (211) a difference between the first ratio (R1) and the second ratio (R2), as shown:

$$R1 - R2 = (L_a/W_a - L_b/W_b) \quad (10)$$

At step 604, determining by the normalized intercept determination module (211) the normalized intercept ($C_f$) by determining a product of the equation 10 with the highest displayed pixel intensity value (G). The normalized intercept ($C_f$) can be denoted as:

$$C_f = G(L_a/W_a - L_b/W_b) \quad (11)$$

Referring back to FIG. 4, at step 404, normalized pixel intensity value determination module (212) the normalized pixel intensity values ($X_b'$) based on the normalized slope value ($M_f$) and the normalized intercept value ($C_f$). The normalized pixel intensity value determination module (212) may use the equations 7 and 11 to transform the ($X_b$) to ($X_b'$) as shown below:

$$X_b' = M_f X_b + C_f \quad (12)$$

Table 2 shows exemplary normalized pixel intensity values for the area in the second image, with respect to the first image, in accordance with some embodiments of the present disclosure. As shown, the normalized pixel intensity values ($X_b'$) may be in the range of the actual pixel intensity values ($X_a$). Therefore, $X_a$ can be compared with $X_b'$.

TABLE 2

| | | | | | | | |
|---|---|---|---|---|---|---|---|
| 289,526 | 267,538 | 256,544 | 285,862 | 282.197 | 329,838 | 344,497 | 311.515 |
| 274,867 | 256,544 | 252.879 | 278,532 | 289,526 | 329,838 | 333.503 | 311.515 |
| 245.55 | 252.879 | 274.867 | 278.532 | 278.532 | 300.52 | 326,174 | 329.838 |
| 238.22 | 289,526 | 300.52 | 296,856 | 289,526 | 315,179 | 344,497 | 348,162 |
| 278,532 | 311.515 | 278,532 | 300.52 | 322,509 | 333,503 | 344,497 | 340.832 |
| 322.509 | 282.197 | 241.885 | 278.532 | 315.179 | 322.509 | 348.162 | 329.838 |
| 322.509 | 252.879 | 252.879 | 285.862 | 300.52 | 326,174 | 355.491 | 340.832 |
| 304,185 | 274,867 | 293,191 | 304,185 | 329,838 | 351,827 | 348,162 | 348,162 |
| 289.526 | 293,191 | 300.52 | 296,856 | 340,832 | 355,491 | 329,838 | 348,162 |
| 293.191 | 289.526 | 285.862 | 289.526 | 322.509 | 337.168 | 322.509 | 333.503 |

TABLE 2-continued

| | | | | | | | |
|---|---|---|---|---|---|---|---|
| 304,185 | 300.52 | 289.526 | 315,179 | 322.509 | 337,168 | 340,832 | 307.85 |
| 307.85 | 326,174 | 318,844 | 315,179 | 337,168 | 351,827 | 351.827 | 311.515 |
| 315,179 | 322,509 | 333,503 | 304,185 | 326,174 | 359,156 | 348,162 | 329,838 |
| 326,174 | 311.515 | 329.838 | 315.179 | 326,174 | 370.15 | 355,491 | 333.503 |
| 326,174 | 318,844 | 333.503 | 322.509 | 340,832 | 377.48 | 370.15 | 370.15 |
| 318,844 | 329,838 | 337,168 | 329,838 | 326,174 | 351,827 | 381.144 | 381.144 |
| 340,832 | 340,832 | 311.515 | 340,832 | 322,509 | 337,168 | 388,474 | 337.168 |
| 355,491 | 344,497 | 304.185 | 348,162 | 377.48 | 359,156 | 348,162 | 351.827 |
| 344,497 | 340,832 | 333,503 | 348,162 | 384,809 | 355,491 | 329,838 | 399,468 |
| 348,162 | 348,162 | 362,821 | 333,503 | 311.515 | 351.827 | 366,486 | 366,486 |
| 359,156 | 348,162 | 370.15 | 318,844 | 304,185 | 366,486 | 359.156 | 315.179 |
| 344,497 | 329.838 | 340,832 | 326,174 | 355,491 | 351,827 | 307.85 | 333.503 |
| 344,497 | 344,497 | 326.174 | 337,168 | 362,821 | 329,838 | 329,838 | 381.144 |
| 351.827 | 362.821 | 359,156 | 340,832 | 351,827 | 370.15 | 370.15 | 377.48 |
| 351.827 | 333.503 | 370.15 | 348,162 | 381.144 | 388,474 | 344,497 | 348,162 |
| 340.832 | 300.52 | 344,497 | 366,486 | 381,144 | 340,832 | 311.515 | 348,162 |
| 318.844 | 304.185 | 344.497 | 366,486 | 351.827 | 326,174 | 311.515 | 344,497 |
| 344,497 | 326,174 | 359,156 | 348,162 | 337,168 | 344,497 | 337,168 | 344,497 |
| 388.474 | 344,497 | 366,486 | 359,156 | 344,497 | 348,162 | 355,491 | 373.815 |
| 370.15 | 348,162 | 373.815 | 388,474 | 362.821 | 359,156 | 366,486 | 392.139 |
| 351.827 | 359.156 | 388.474 | 373.815 | 344,497 | 373,815 | 366,486 | 373,815 |
| 373.815 | 370.15 | 377.48 | 355,491 | 315,179 | 355,491 | 381.144 | 377.48 |
| | | 322.509 | 326.174 | 322.509 | 355,491 | 362.821 | 326,174 |
| | | 326.174 | 337.168 | 326,174 | 348,162 | 362,821 | 315,179 |
| | | 348.162 | 351.827 | 340,832 | 344,497 | 340.832 | 333.503 |
| | | 366,486 | 337.168 | 333.503 | 351.827 | 307.85 | 315,179 |
| | | 340.832 | 318.844 | 307.85 | 340.832 | 315,179 | 282,197 |
| | | 300.52 | 329.838 | 333.503 | 329,838 | 326,174 | 318,844 |
| | | 318,844 | 348,162 | 366,486 | 326,174 | 307.85 | 344,497 |
| | | 351,827 | 329.838 | 329.838 | 326.174 | 315.179 | 315,179 |
| | | 340.832 | 293.191 | 293.191 | 329.838 | 340.832 | 326,174 |
| | | 326.174 | 300.52 | 326,174 | 344,497 | 348,162 | 359.156 |
| | | 329,838 | 355,491 | 355,491 | 359,156 | 340.832 | 351.827 |
| | | 326,174 | 362,821 | 337,168 | 351.827 | 355,491 | 359.156 |
| | | 318,844 | 344,497 | 348.162 | 355,491 | 381.144 | 366,486 |
| | | 333.503 | 377.48 | 384,809 | 366,486 | 384,809 | 348,162 |
| | | 362,821 | 392,139 | 388.474 | 348,162 | 359.156 | 351.827 |
| | | 366,486 | 377.48 | 362,821 | 340.832 | 333.503 | 340.832 |
| | | 355,491 | 373.815 | 333.503 | 344,497 | 340.832 | 315.179 |
| | | 362.821 | 348,162 | 318,844 | 315,179 | 344,497 | 322.509 |
| | | 362,821 | 318,844 | 318,844 | 293,191 | 322.509 | 304,185 |
| | | 344,497 | 322.509 | 307.85 | 311.515 | 326,174 | 296.856 |
| | | 344,497 | 340.832 | 311.515 | 318,844 | 337,168 | 340.832 |
| | | 355,491 | 359,156 | 340,832 | 337,168 | 340.832 | 333,503 |
| | | 359,156 | 351.827 | 362,821 | 388,474 | 373,815 | 307.85 |
| | | 340.832 | 326,174 | 362,821 | 388,474 | 373.815 | 326.174 |
| | | 337.168 | 340,832 | 351.827 | 348,162 | 333.503 | 318.844 |
| | | 377.48 | 370.15 | 329,838 | 355,491 | 340,832 | 307.85 |
| | | 377.48 | 362,821 | 348,162 | 388,474 | 366,486 | 337,168 |
| | | 337,168 | 355,491 | 373,815 | 362.821 | 344,497 | 340.832 |
| | | 362.821 | 366,486 | 333.503 | 311.515 | 329,838 | 337,168 |
| | | 421,456 | 351,827 | 293.191 | 329,838 | 337,168 | 315,179 |
| | | 414,127 | 326,174 | 315,179 | 388,474 | 344,497 | 289,526 |
| | | 395.803 | 348.162 | 340.832 | 370.15 | 329.838 | 322.509 |

In an embodiment the generated normalized pixel intensity values ($X_b'$) may represent the normalized image ($I_b'$). In an embodiment, generating the normalized pixel intensity values ($X_b'$) may inherently mean generating the normalized image ($I_b'$). In a further embodiment, the actual pixel intensity values ($X_b'$) may be similar to the actual pixel intensity values ($X_a$) of the first image ($I_a$). Therefore, the present disclosure provides a solution enabling meaningful comparison of images (I) which have different actual pixel intensity values, by normalizing the actual pixel intensity values (X). For example, if images have to be classified or labelled, the images may have to be compared with reference images. The images to be classified or labelled may have pixel intensity values different from the pixel intensity values of the reference images. For the images, normalized pixel intensity values can be generated, and the pixel intensity values of the images may be in the range of the reference images such that meaningful comparisons may be performed to successfully classify/label the images.

In an embodiment, the normalization of actual pixel intensity values (X) provides meaningful comparison. Efficient classification, labelling, segmentation and/or multi-label classification can be performed by meaningful comparison between images. Thus, the normalized image ($I_b'$) may be compared with the first image ($I_a$) and the comparison may be used for at least one of image labelling, image classification, image segmentation, and multi-label classification. Multi-label classification will be understood to refer to a type of classification whereby an image may be categorised into more than one class or as having more than one label.

Computer System

Figure 7:
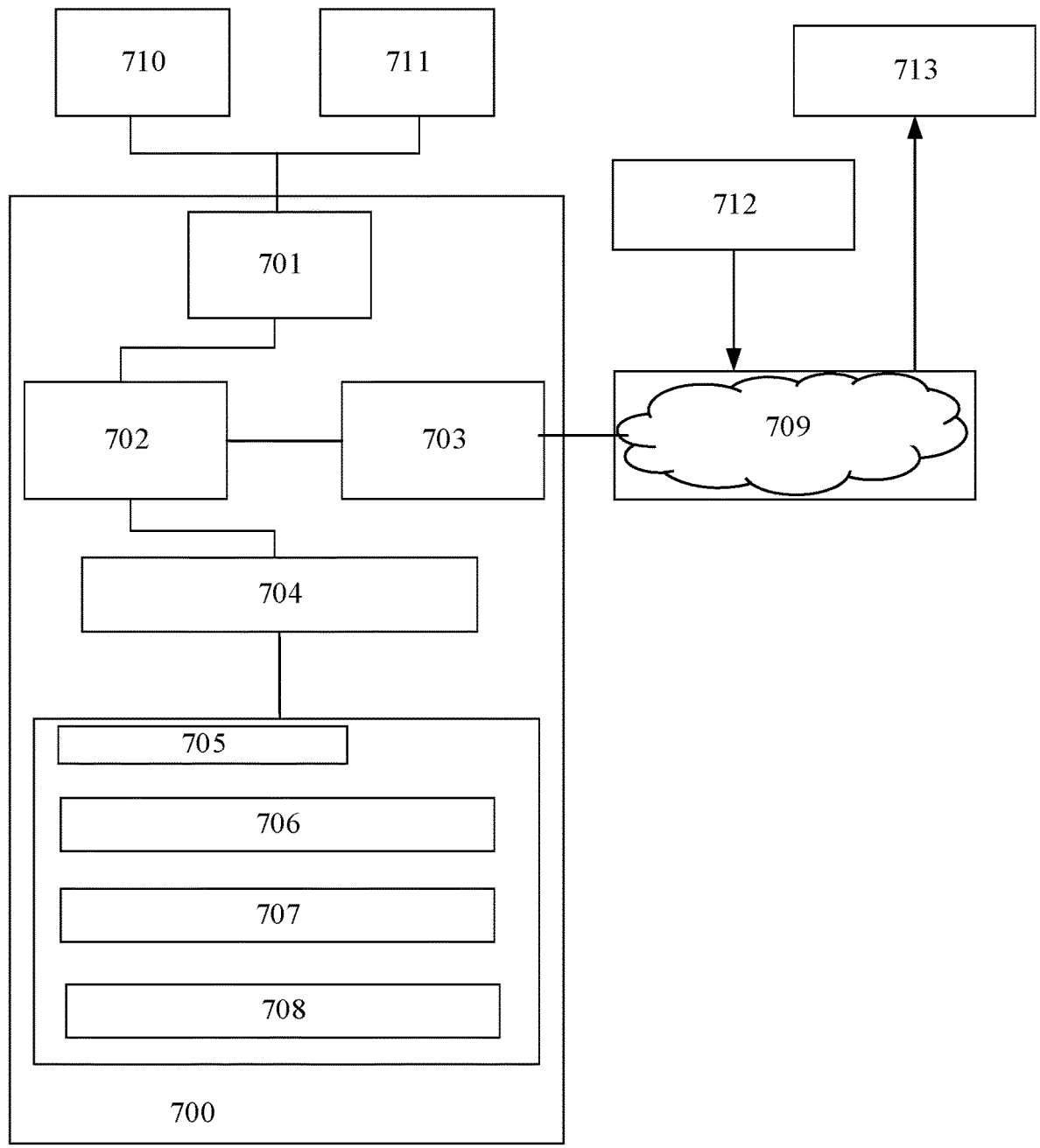
FIG. 7 shows a general-purpose computer system for normalizing pixel intensity of images, in accordance with some embodiments of the present disclosure.

FIG. 7 illustrates a block diagram of an exemplary computer system (700) for implementing embodiments consistent with the present disclosure. The computer system (700) may comprise a central processing unit ("CPU" or "processor") (702). The processor (702) may comprise at least one data processor for executing program components for dynamic resource allocation at run time. The processor (702) may include specialized processing units such as integrated system (bus) controllers, memory management control units, floating point units, graphics processing units, digital signal processing units, etc.

The processor (702) may be disposed in communication with one or more input/output (I/O) devices (not shown) via I/O interface (701). The I/O interface (701) may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface (701), the computer system (700) may communicate with one or more I/O devices. For example, the input device (710) may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device (711) may be a printer, fax machine, video display (e.g., cathode ray tube (CRT), liquid crystal display (LCD), light-emitting diode (LED), plasma. Plasma display panel (PDP), Organic light-emitting diode display (OLED) or the like), audio speaker, etc.

In some embodiments, the computer system (700)) is connected to the service operator through a communication network (709). The processor (702) may be disposed in communication with the communication network (709) via a network interface (703). The network interface (703) may communicate with the communication network (709). The network interface (703) may employ connection protocols including, without limitation, direct connect, Ethernet (e.g., twisted pair 10/100/1000 Base T), transmission control protocol/Internet protocol (TCP/IP), token ring, IEEE 802.11a/b/g/n/x, etc. The communication network (709) may include, without limitation, a direct interconnection, e-commerce network, a peer to peer (P2P) network, local area network (LAN), wide area network (WAN), wireless network (e.g., using Wireless Application Protocol), the Internet, Wi-Fi, etc. Using the network interface (703) and the communication network (709), the computer system (700) may communicate with the one or more service operators.

In some embodiments, the processor (702) may be disposed in communication with a memory (705) (e.g., RAM, ROM, etc. not shown in FIG. 7) via a storage interface (704). The storage interface (704) may connect to memory (705) including, without limitation, memory drives, removable disc drives, etc., employing connection protocols such as serial advanced technology attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory (705) may store a collection of program or database components, including, without limitation, user interface (706), an operating system (707), web server (708) etc. In some embodiments, computer system (700) may store user/application data (706), such as the data, variables, records, etc. as described in this disclosure. Such databases may be implemented as fault-tolerant, relational, scalable, secure databases such as Oracle or Sybase.

The operating system (707) may facilitate resource management and operation of the computer system (700). Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, 10 etc.), Apple iOS, Google Android, Blackberry OS, or the like.

In some embodiments, the computer system (700) may implement a web browser (708) stored program component. The web browser (708) may be a hypertext viewing application, such as Microsoft Internet Explorer, Google Chrome, Mozilla Firefox, Apple Safari, etc. Secure web browsing may be provided using Secure Hypertext Transport Protocol (HTTPS), Secure Sockets Layer (SSL), Transport Layer Security (TLS), etc. Web browsers (708) may utilize facilities such as AJAX, DHTML, Adobe Flash, JavaScript, Java, Application Programming Interfaces (APIs), etc. In some embodiments, the computer system (700) may implement a mail server stored program component. The mail server may be an Internet mail server such as Microsoft Exchange, or the like. The mail server may utilize facilities such as ASP. ActiveX, ANSI C++/C #, Microsoft .NET, CGI scripts, Java. JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system (700) may implement a mail client stored program component. The mail client may be a mail viewing application, such as Apple Mail. Microsoft Entourage, Microsoft Outlook, Mozilla Thunderbird, etc.

In an embodiment, the imaging unit (712) may be configured to capture first and second images ($I_a$ and $I_b$) and provide the first and second images ($I_a$ and $I_b$) to the computer system (700) over the communication network (709) for normalizing the actual pixel intensity values. In an embodiment, a display unit (713) may display the first and the second images ($I_a$ and $I_b$).

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3, FIG. 4, and FIG. 7 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

REFERRAL NUMERALS:

| Reference number | Description |
| --- | --- |
| 100 | System |
| 101 | Image processing apparatus |
| 102 | Imaging unit |
| 103 | Subject |
| 104 | Display unit |
| 201 | I/O interface |
| 202 | Memory |
| 203 | Processor |
| 204 | Data |
| 205 | Contrast and illumination parameters |
| 206 | Displayed pixel intensity value |
| 207 | Other data |
| 208 | Modules |
| 209 | Communication module |
| 210 | Normalized slope determination module |
| 211 | Normalized intercept determination module |
| 212 | Normalized pixel intensity determination module |
| 213 | Other modules |
| 700 | Computer system |
| 701 | I/O interface |
| 702 | Processor |
| 703 | Network interface |
| 704 | Storage interface |
| 705 | Memory |
| 706 | User interface |
| 707 | Operating system |
| 708 | Web service |
| 709 | Communication network |
| 710 | Input device |
| 711 | Output device |
| 712 | Imaging unit |
| 713 | Display unit |

The invention claimed is:

1. A method of normalizing pixel intensity of images, comprising:

receiving, by an image processing apparatus, actual pixel intensity values ($X_a$, $X_b$) generated by the image processing apparatus, one or more contrast parameters and one or more illumination parameters, of a first image ($I_a$) and a second image ($I_b$);

determining, by the image processing apparatus, one or more normalized parameters based on the one or more contrast and illumination parameters of the first image ($I_a$) and the second image ($I_b$);

determining, by the image processing apparatus, normalized pixel intensity values ($X_b'$) of the second image ($I_b$) based on the one or more normalized parameters; and generating, by the image processing apparatus, a normalized image ($I_b'$) by transforming the second image ($I_b$) with respect to the first image ($I_a$), using the normalized pixel intensity values ($X_b'$), wherein the first image and the second image appear visually similar on a display unit despite different pixel intensities representing a same area in the first image and the second image.

2. The method as claimed in claim 1, wherein the displayed pixel intensity values ($Y_a$, $Y_b$) of the first image ($I_a$) and the second image ($I_b$) vary with respective actual pixel intensity values ($X_a$, $X_b$), wherein the displayed pixel intensity values comprise pixel intensity values displayed on the display unit.

3. The method as claimed in claim 1, wherein the one or more contrast and illumination parameters comprise Hue, saturation, contrast, brightness, Gamma, or combinations thereof.

4. The method as claimed in claim 1, comprising:

receiving the actual pixel intensity values ($X_a$, $X_b$), highest displayed pixel intensity value (G), window level value ($L_a$, $L_b$) and window width value ($W_a$, $W_b$), of the first image ($I_a$) and the second image ($I_b$), wherein the displayed pixel intensity values ($Y_a$, $Y_b$) of the first image ($I_a$) and the second image ($I_b$) varies linearly with respective actual pixel intensity values ($X_a$, $X_b$);

determining a normalized slope value ($M_f$) based on the window width value ($W_a$, $W_b$) of the first image ($I_a$) and the second image ($I_b$);

determining a normalized intercept value ($C_f$) based on, the window level value ($L_a$) of the first image ($I_a$), the window level value ($L_b$) of the second image ($I_b$), the window width value ($W_a$) of the first image ($I_a$), the window width value ($W_b$) of the second image ($I_b$) and the highest displayed pixel intensity value (G);

determining the normalized pixel intensity values ($X_b'$) of the second image ($I_b$) base on the normalized slope value ($M_f$) and the normalized intercept value ($C_f$); and generating the normalized image ($I_b'$) by transforming the second image ($I_b$) with respect to the first image ($I_a$), using the normalized pixel intensity values ($X_b'$) of the second image ($I_b$).

5. The method as claimed in claim 4, wherein the first image ($I_a$) and the second image ($I_b$) are images of a same object appearing visually same despite having different actual pixel intensities.

6. The method as claimed in claim 4, wherein determining the normalized slope value ($M_f$) comprises determining a ratio of the window width value ($W_a$) of the first image to the window width value ($W_b$) of the second image.

7. The method as claimed in claim 4, wherein determining the normalized intercept value ($C_f$) comprises:
   determining a first ratio of the window level ($L_a$) to the window width ($W_a$) of the first image ($I_a$);
   determining a second ratio of the window level ($L_b$) to the window width ($W_b$) of the second image ($I_b$);
   determining a difference of the first ratio and the second ratio; and
determining the normalized intercept value ($C_f$) by determining a product of the difference and the highest displayed pixel intensity (G).

8. The method as claimed in claim 4, wherein determining the normalized pixel intensity values ($X_b'$) comprises:
   determining a product of the normalized slope value ($M_f$) and the actual pixel intensity value ($X_b$) of the second image ($I_b$); and
   determining a sum of the determined product and a normalized intercept value ($C_f$).

9. The method as claimed in claim 8, wherein the second image ($I_b$) is transformed into the normalized image ($I_b'$) using the normalized pixel intensity values ($X_b'$), wherein the normalized image ($I_b'$) and the first image ($I_a$) have same actual pixel intensity values for one or more areas in the first image ($I_a$) and the normalized image ($I_b'$).

10. The method as claimed in claim 4, wherein the window width values ($W_a$, $W_b$) indicate contrast of the first image ($I_a$) and the second image ($I_b$) respectively, and the window level values ($L_a$, $L_b$) indicate brightness of the first image ($I_a$) and the second image ($I_b$) respectively.

11. The method as claimed in claim 4, wherein the normalized image ($I_b'$) is compared with the first image ($I_a$), wherein the comparison is used for at least one of image labelling, image classification, image segmentation, and multi-label classification.

12. An image processing apparatus for normalizing pixel intensity of images, comprising:
   a processor; and
   a memory, communicatively coupled with the processor, storing processor executable instructions, which on execution causes the processor to:
   receive actual pixel intensity values ($X_a$, $X_b$) generated by the image processing apparatus, one or more contrast parameters and one or more illumination parameters, of a first image ($I_a$) and a second image ($I_b$);
   determine one or more normalized parameters based on the one or more contrast and illumination parameters of the first image ($I_a$) and the second image ($I_b$);
   determine normalized pixel intensity values ($X_b'$) of the second image ($I_b$) based on the one or more normalized parameters; and
   generate a normalized image ($I_b'$) by transforming the second image ($I_b$) with respect to the first image ($I_a$), using the normalized pixel intensity values ($X_b'$),
   wherein the first image and the second image appear visually similar on a display unit despite different pixel intensities representing a same area in the first image and the second image.

13. The image processing apparatus as claimed in claim 12, wherein the processor is configured to:
   receive the actual pixel intensity values ($X_a$, $X_b$), highest displayed pixel intensity value (G), window level value ($L_a$, $L_b$) and window width value ($W_a$, $W_b$), of the first image ($I_a$) and the second image ($I_b$), wherein the displayed pixel intensity values ($Y_a$, $Y_b$) of the first image ($I_a$) and the second image ($I_b$) varies linearly with respective actual pixel intensity values ($X_a$, $X_b$);
   determine a normalized slope value ($M_f$) based on the window width value ($W_a$, $W_b$) of the first image ($I_a$) and the second image ($I_b$);
   determine a normalized intercept value ($C_f$) based on, the window level value ($L_a$) of the first image ($I_a$), the window level value ($L_b$) of the second image ($I_b$), the window width value ($W_a$) of the first image ($I_a$), the window width value ($W_b$) of the second image ($I_b$) and the highest displayed pixel intensity value (G);
   determine the normalized pixel intensity values ($X_b'$) of the second image ($I_b$) based on the normalized slope value ($M_f$) and the normalized intercept value ($C_f$); and
   generate the normalized image ($I_b'$) by transforming the second image ($I_b$) with respect to the first image ($I_a$), using the normalized pixel intensity values ($X_b'$) of the second image ($I_b$).

14. The image processing apparatus as claimed in claim 13, wherein the processor receives the first image ($I_a$) and the second image ($I_b$) of a same object appearing visually same despite having different actual pixel intensities.

15. The image processing apparatus as claimed in claim 13, wherein the processor determines the normalized slope value ($M_f$) by determining a ratio of the window width value ($W_a$) of the first image to the window width value ($W_b$) of the second image.

16. The image processing apparatus as claimed in claim 13, wherein the processor determines the normalized intercept value ($C_f$), wherein the processor is configured to:
   determine a first ratio of the window level ($L_a$) to the window width ($W_a$) of the first image ($I_a$);
   determine a second ratio of the window level ($L_b$) to the window width ($W_b$) of the second image ($I_b$);
   determine a difference of the first ratio and the second ratio; and
determine the normalized intercept value ($C_f$) by determining a product of the difference and the highest displayed pixel intensity (G).

17. The image processing apparatus as claimed in claim 13, wherein the processor determines the normalized pixel intensity values ($X_b'$), wherein the processor is configured to:
   determine a product of the normalized slope value ($M_f$) and the actual pixel intensity values ($X_b$) of the second image ($I_b$); and
   determine a sum of the determined product and a normalized intercept value ($C_f$).

18. The image processing apparatus as claimed in claim 17, wherein the processor transforms the second image ($I_b$) into the normalized image ($I_b'$) using the normalized pixel intensity values ($X_b'$), wherein the normalized image ($I_b'$) and the first image ($I_a$) have same actual pixel intensity values for one or more areas in the first image ($I_a$) and the normalized image ($I_b'$).

19. The image processing apparatus as claimed in claim 13, wherein the processor is configured to compare the normalized image ($I_b'$) with the first image ($I_a$), wherein the comparison is used for at least one of image labelling, image classification, image segmentation, and multi-label classification.

20. A system comprising:
an imaging device;
a display unit; and
an image processing apparatus as claimed in claim 12;
wherein the imaging device is configured to capture a first image ($I_a$) and a second image ($I_b$) of an object, wherein a first window level value ($L_a$) and a first window width value ($W_a$) are applied to the first image ($I_a$) and a second window level value ($L_b$) and a second window width value ($W_b$) are applied to the second image ($I_b$) for displaying the first image ($I_a$) and the second image ($I_b$) on the display unit;
wherein the image processing apparatus is configured to:
determine a normalized slope value ($M_f$) based on the window width value ($W_a$, $W_b$) of the first image ($I_a$) and the second image ($I_b$);
determine a normalized intercept value ($C_f$) based on, the window level value ($L_a$) of the first image ($I_a$), the window level value ($L_b$) of the second image ($I_b$), the window width value ($W_a$) of the first image ($I_a$), the window width value ($W_b$) of the second image ($I_b$) and the highest displayed pixel intensity value ($G$);
determine normalized pixel intensity values ($X_b'$) of the second image ($I_b$) based on the normalized slope value ($M_f$) and the normalized intercept value ($C_f$); and
generate the normalized image ($I_b'$) by transforming the second image ($I_b$) with respect to the first image ($I_a$), using the normalized pixel intensity values ($X_b'$) of the second image ($I_b$).

* * * * *